United States Patent
Sato et al.

(10) Patent No.: US 6,970,214 B2
(45) Date of Patent: Nov. 29, 2005

(54) ELLIPTICAL POLARIZER AND LIQUID CRYSTAL DISPLAY DEVICE

(75) Inventors: Haruyoshi Sato, Yokohama (JP); Shinichiro Suzuki, Yokohama (JP); Kenji Hosaki, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 10/791,113

(22) Filed: Mar. 2, 2004

(65) Prior Publication Data

US 2004/0169792 A1 Sep. 2, 2004

Related U.S. Application Data

(63) Continuation of application No. PCT/JP02/08663, filed on Aug. 28, 2002.

(30) Foreign Application Priority Data

Sep. 4, 2001 (JP) .............................. 2001-267940

(51) Int. Cl.$^7$ ........................................... G02F 1/1335
(52) U.S. Cl. ...................... 349/96; 349/99; 349/102; 349/103; 349/122
(58) Field of Search .................. 349/96, 102, 103, 349/99, 122

(56) References Cited

U.S. PATENT DOCUMENTS 5,519,523 A * 5/1996 Madokoro et al. .......... 349/117

FOREIGN PATENT DOCUMENTS

| EP | 0 644 439 A1 | 3/1995 |
|---|---|---|
| JP | 04-003001 A | 1/1992 |
| JP | 07-261023 A | 10/1995 |
| JP | 08-278491 A | 10/1996 |
| JP | 2000-347027 A | 12/2000 |
| JP | 2002-214439 A | 7/2002 |
| JP | 2002-258269 A | 9/2002 |
| WO | WO 01/046720 A1 | 6/2001 |

* cited by examiner

Primary Examiner—Dung T. Nguyen
Assistant Examiner—George Y. Wang
(74) Attorney, Agent, or Firm—Akin Gump Strauss Hauer & Feld, LLP

(57) ABSTRACT

When an optical element is produced using a liquid crystal film having no supporting substrate film for the purpose of decreasing the weight, the liquid crystal film layer may often pose problems of fine wrinkly deformation of and cracking in a caused by strain occurring during a manufacturing/processing step. The present invention intends to provide an elliptical polarizer having a thinned optical anisotropic element which is free from such deformation and cracking. The elliptical polarizer of the present invention comprises at least a polarizer and an optical anisotropic element wherein said optical anisotropic element comprises a liquid crystalline substance layer with a fixed liquid crystal orientation, a tacky adhesive/adhesive layer, and a stress blocking layer.

4 Claims, 1 Drawing Sheet

ELLIPTICAL POLARIZER AND LIQUID CRYSTAL DISPLAY DEVICE

CROSS-REFERENCE TO RELATED APPLICATIONS

This application is a continuation of International Application No. PCT/JP02/08663, filed Aug. 28, 2002 the disclosure of which is incorporated herein by reference.

TECHNICAL FIELD

The present invention relates to thinned elliptical polarizers and liquid crystal display devices equipped with the same.

BACKGROUND ART

Liquid crystal displays have expanded their practical applications ranging from displays for pocket- or desktop-calculators to those for word processors and personal computers, due to their remarkably improved displaying performance. Furthermore, the liquid crystal displays have been widening their markets wherein the displays are used for personal digital assistants (PDA) because the displays can make the best use of their peculiar characteristics, i.e., thin in size and light in weight. The personal digital assistants are strongly demanded to be decreased in thickness and weight, and particularly required to decrease the thickness and weight of the displays. In response to such strong demands from the users, the decrease of thickness of a polarizer has been in progress by thinning the starting substance thereof, i.e., a resinous substrate film. However, it was difficult to decrease the thickness of an optical retardation plate constituting a polarizer due to the characteristics of the optical retardation plastic film.

In an optical retardation plate wherein a liquid crystal film is used, only the liquid crystal film exhibiting an optical retardation function is a thin film, but it was difficult to decrease the total thickness of the retardation plate due to the presence of a supporting substrate film which also has a function of protecting the liquid crystal layer.

As a technique capable of solving these problems, Japanese Patent Laid-Open Publication No. 8-278491 discloses a method of producing an optical element using a liquid crystal film which is free of a supporting substrate film.

However, although this method has an advantage that a remarkably thin optical element can be obtained because of the use of a liquid crystal film from which a supporting substrate film taking up a major portion of the film thickness is excluded, but also has a disadvantage due to the absence of a supporting substrate film, i.e., a problem that a warp or distortion assumedly caused by various stress generated during the manufacturing and processing processes adversely affects directly the liquid crystal film layer in which, therefore, fine wrinkly deformations and cracks would be formed.

There is a method proposed as one of the means for solving the problem in which method a post-treatment such as heat-aging is conducted for removing warps and distortions. However, this method may not always solve the problem completely and creates another problem of an additional tedious post-treatment.

The object of the present invention is to provide an elliptical polarizer comprising as a constituting element a thinned optical anisotropic element which does not pose problems of the occurrence of fine wrinkly deformation of and cracking in the liquid crystalline substance layer assumedly caused by various stresses generating during a manufacturing/processing steps without employing an additional tedious post-treatment such as heat aging, and a liquid crystal display device equipped with such an elliptical polarizer.

DISCLOSURES OF THE INVENTION

Figure 1A:
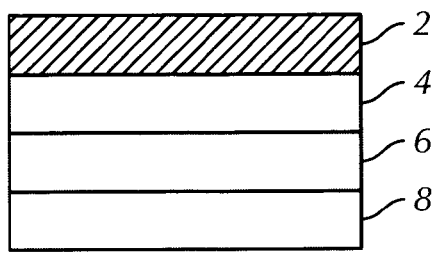
FIGS. 1A–1C are sectional views of three embodiments of elliptical polarizers according to the invention.

That is, according to a first aspect of the present invention, there is provided an elliptical polarizer comprising at least a polarizer and an optical anisotropic element wherein the optical anisotropic element comprises a liquid crystalline substance layer with a fixed liquid crystal orientation, a tacky adhesive/adhesive layer, and a stress blocking layer.

According to a second aspect of the invention, there is provided the elliptical polarizer of the first aspect wherein the stress blocking layer is arranged between the liquid crystalline substance layer and the tacky adhesive/adhesive layer.

According to a third aspect of the present invention, there is provided the elliptical polarizer of the first aspect wherein the stress blocking layer has a thickness of 0.3 μm or greater and 40 μm or less and a glass transition temperature (Tg) of 20° C. or higher.

According to a forth aspect of the present invention, there is provided the elliptical polarizer of the first aspect having a thickness of 450 μm or less.

According to a fifth aspect of the present invention, there is provided a liquid crystal display device equipped with at least one elliptical polarizer of the first aspect.

The present invention will be described in detail below.

The elliptical polarizer of the present invention is an elliptical polarizer comprising at least a polarizer and an optical anisotropic element wherein the optical anisotropic element comprises a liquid crystalline substance layer with a fixed liquid crystal orientation, a tacky adhesive/adhesive layer, and a stress blocking layer.

The optical anisotropic element constituting the elliptical polarizer of the present invention is constituted by a laminate comprising a liquid crystalline substance layer with a fixed liquid crystal orientation, a tacky adhesive/adhesive layer, and a stress blocking layer. However, if necessary, a transparent protective layer(s) may be provided on one or both surfaces of the liquid crystalline substance layer. Furthermore, a tacky adhesive/adhesive layer can be provided with a function of such a transparent protective layer depending on the type of the tacky adhesive/adhesive.

One or more stress blocking layers may be arranged on one or both surfaces of the liquid crystalline substance layer. At least one of the stress blocking layers is preferably arranged between the liquid crystalline substance layer and the tacky adhesive/adhesive layer.

No particular limitation is imposed on the construction of the elliptical polarizers of the present invention as long as it is constructed as described above. Examples of the arrangements of the components constituting the elliptical polarizer of the present invention are as follows:

(1) polarizer/liquid crystalline substance layer/tacky adhesive or adhesive layer/stress blocking layer
(2) polarizer/tacky adhesive or adhesive layer/stress blocking layer/liquid crystalline substance layer (3) polarizer/tacky adhesive or adhesive layer/stress blocking layer/transparent protective layer/liquid crystalline substance layer (4) polarizer/tacky adhesive or adhesive layer/stress blocking layer/transparent protective layer/liquid crystalline substance layer/transparent protective layer (5) polarizer/tacky adhesive or adhesive layer/stress blocking layer/transparent protective layer/liquid crystalline substance layer/transparent protective layer/tacky adhesive or adhesive layer/stress blocking layer (6) polarizer/tacky adhesive or adhesive layer/transparent protective layer/liquid crystalline substance layer/transparent protective layer/stress blocking layer (7) polarizer/tacky adhesive or adhesive layer/stress blocking layer/transparent protective layer/liquid crystalline substance layer/transparent protective layer/stress blocking layer (8) polarizer/tacky adhesive or adhesive layer/transparent protective layer/liquid crystalline substance layer/transparent protective layer/stress blocking layer/transparent protective layer/liquid crystalline substance layer/transparent protective layer (9) polarizer/tacky adhesive or adhesive layer/liquid crystalline substance layer/transparent protective layer/stress blocking layer.

Among the above examples, preferred are (6), (7) and (8).

If necessary, the elliptical polarizers with the above constructions may be provided with another tacky adhesive/adhesive layer for attaching the polarizers to a liquid crystal display.

The liquid crystalline substance layer with a fixed liquid crystal orientation used herein is a layer wherein a liquid crystalline substance aligned in a liquid crystal orientation is fixed using a fixing means. The fixing means may be a method wherein a low molecular weight or polymeric liquid crystalline substance having a reactive functional group is aligned, treated such that the functional group is reacted and then fixed by curing or cross-linking or a method a polymeric liquid crystalline substance in an aligned state is quenched so as to be in a glassy state and fixed. Example of quenching methods are a method wherein a polymeric liquid crystalline substance is removed from a heating process to in the air at ordinary temperature and a forced-cooling method such as wherein a polymeric liquid crystalline substance is blown with a cold gas, contacted with cooling rollers, or put into water. Examples of the reactive functional groups are vinyl, (meth)acryloyl, vinyloxy, epoxy, oxetane, carboxyl, hydroxyl, amino, and acid anhydrate groups, each of which may be reacted in a manner suitable therefor.

Liquid crystalline substances used for the liquid crystalline substance layer may be selected from a wide range of those regardless of whether they are low molecular weight liquid crystalline substances and polymeric liquid crystalline substances, depending on the intended uses of the elliptical polarizer and production methods thereof. However, polymeric liquid crystalline substances are preferably used. The molecular shape of the liquid crystalline substance may be bar- or disc-like shape. For example, the liquid crystalline substance may be disco-nematic liquid crystalline compounds having discotic nematic liquid crystallinity.

Examples of liquid crystal phases of the liquid crystalline substance layer before being fixed are nematic, twisted nematic, cholesteric, hybrid nematic, hybrid twisted nematic, discotic nematic, and smectic phases.

Polymeric liquid crystalline substances may be various main chain type polymeric liquid crystalline substances, side chain type polymeric liquid crystalline substances, and mixtures thereof. Examples of main chain type polymeric liquid crystalline substances are polyester-, polyamide-, polycarbonate-, polyimide-, polyurethane-, polybenzimidazole-, polybenzoxazole-, polybenzthiazole-, polyazomethine-, polyesteramide-, polyestercarbonate- and polyesterimide-based polymeric liquid crystalline substances, and mixtures thereof. Examples of side chain type polymeric liquid crystalline substances are those wherein a mesogen group as a side chain bonds to substances having a straight-chain or cyclic main chain, such as polyacrylate-, polymethacrylate-, polyvinyl-, polysiloxane-, polyether-, polymalonate-, and polyester-based ones, and mixtures thereof. Among these substances, the main chain type polymeric substances are preferred, and the polyester-based ones are particularly preferred with the objectives of easy synthesis and aligning.

Examples of low molecular weight liquid crystalline substances are compounds exhibiting liquid crystallinity obtained by introducing the above-described reactive functional group to the terminal ends of saturated benzene carboxylic acid derivatives, unsaturated benzene carboxylic acid derivatives, biphenylcarboxylic acid derivatives, aromatic oxycarboxylic acid derivatives, Schiff base derivatives, bis-azo methine compound derivatives, azo compounds derivatives, azoxy compound derivatives, cyclohexane ester compounds derivatives, or sterol compound derivatives; and compositions obtained by adding a cross-linkable compound to any compounds exhibiting liquid crystallinity among the compound derivatives described above. Examples of discotic liquid crystalline compounds are triphenylene- and truxene-based compounds.

Alternatively, various compounds having a functional group or site reactive by a thermal or photo crosslinking reaction may be blended with the liquid crystalline substance to an extent that the exhibition of liquid crystallinity is not bothered. Examples of such crosslinkable functional groups are various reactive functional groups described above.

A composition containing the above-described liquid crystalline substance and various compounds added if necessary in a molten state or in the form of a solution is coated over an alignment substrate so as to form a film layer and then dried and heated to align the composition in a liquid crystal orientation. If necessary, the aligned orientation is fixed by the above-described fixing methods such as photo irradiation and/or heat treatment (polymerization/crosslinking) thereby forming a liquid crystalline substance layer with a fixed liquid crystal orientation.

No particular limitation is imposed on the solvent used for preparing the solution to be coated over an alignment substrate as long as it can dissolve the liquid crystalline substance or composition used in the present invention and be evaporated under appropriate conditions. Preferred examples of the solvent are ketones such as acetone, methylethyl ketone, and isophorone; ether alcohols such as butoxyethyl alcohol, hexyloxyethyl alcohol, and methoxy-2-propanol; glycol ethers such as ethylene glycol dimethyl ether and diethylene glycol dimethyl ether; esters such as ethyl acetate, methoxypropyl acetate and ethyl lactate; phenols such as phenol and chlorophenol; amides such as N,N-dimethylformamide, N,N-dimethylacetoamide, and N-methylpyrrolidone; halogenated hydrocarbons such as chloroform, tetrachloroethane, and dichlorobenzene; and mixtures thereof. A surfactant, a defoaming agent, or a leveling agent may be added to the solution so as to form a uniform film layer on an alignment substrate. Furthermore, for the purpose of coloring, dichroic dyes, normal dyes, and pigments may be added to an extent that they do not prevent the liquid crystalline substance from exhibiting a liquid crystallinity.

No particular limitation is imposed on the methods of coating as long as the uniformity of the film layer can be maintained. Therefore, there may be used any conventional method such as roll coating, die coating, dip coating, curtain coating, and spin coating methods. The coating may be followed by a solvent-removing process, i.e., drying using a heater or a hot air blowing. The film thickness of the coating in a dried state is from 0.1 μm to 50 μm, preferably 0.2 μm to 20 μm. A film thickness deviating the range is not preferred because the resulting liquid crystalline substance layer would lack optical performance characteristics and would be sufficiently aligned.

Figure 1B:
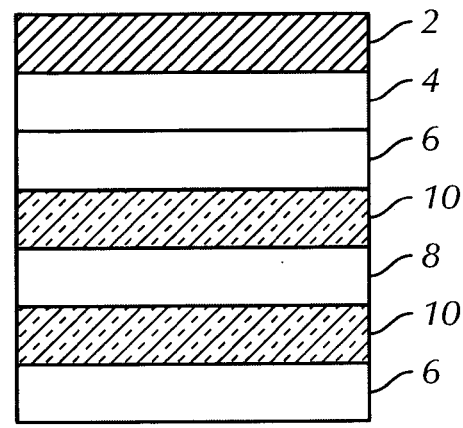
Figure 1C:
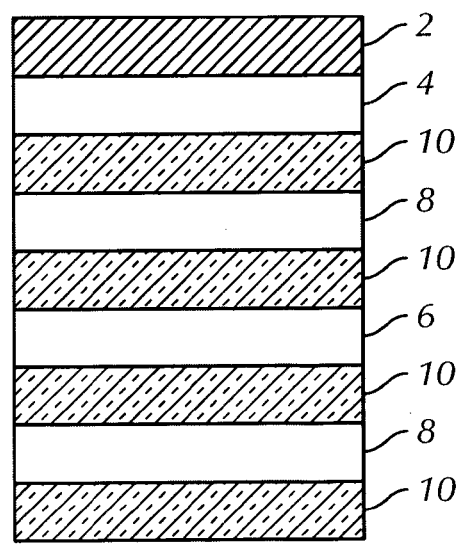

Three of these exemplary elliptical polarizers according to the invention are depicted in FIGS. 1A–1C. FIG. 1A depicts embodiment (2), in which the elliptical polarizer contains a polarizer 2, a tacky adhesive or adhesive layer 4, a stress blocking layer 6, and a liquid crystalline substance layer 8. One of the preferred embodiments, (7), is depicted in FIG. 1B. As shown, the elliptical polarizer further contains a transparent protective layer 10 on both sides of the liquid crystalline substance layer 8, as well as two stress blocking layers 6 sandwiching the transparent protective layers 10. Finally, FIG. 1C shows a second preferred embodiment (8). Tin this elliptical polarizer, there are transparent protective layers 10 between each pair of layers, such as between the adhesive layer 4 and the liquid crystalline layer 8 and between the liquid crystalline layer 8 and the stress blocking layer 6. This elliptical polarizer contains two liquid crystalline layers 8.

Thereafter, if necessary, a heat treatment may be conducted after forming a liquid crystal orientation. In this heat treatment, the liquid crystalline substance is heated to a range of temperatures at which the substance exhibits a liquid crystal phase, so as to be aligned in the liquid crystal orientation by its self-orientability. Since the conditions for the heat treatment vary in optimum conditions and limits depending on the liquid crystal phase behavior temperature (transition temperature) of the liquid crystalline substance to be used, it can not be determined with certainty. However, it is within the range of usually 10 to 300° C., preferably 30 to 250° C. Too low temperatures are not preferred because there is a possibility that aligning in the liquid crystal orientation may not sufficiently progress, while too high temperatures are not also preferred because the liquid crystalline substance would be decomposed or the aligning substrate would be adversely affected. The heat treatment is conducted for usually 3 seconds to 60 minutes, preferably 10 seconds to 30 minutes. The heat treatment for shorter than 3 seconds is not preferred, because there is a possibility that the liquid crystal orientation may not be completed. Whereas the heat treatment for longer than 60 minutes is not also preferred, because the productivity is extremely deteriorated. After the liquid crystalline substance is completely aligned in a liquid crystal orientation by a heat treatment, the liquid crystalline substance layer on an alignment substrate is fixed using a method suitable for the liquid crystalline substance.

Examples of alignment substrates are films of such as polyimide, polyamide, polyamideimide, polyphenylene sulfide, polyphenylene oxide, polyether ketone, polyetherether ketone, polyether sulfone, polysulfone, polyethylene terephthalate, polyethylene naphthalate, polyarylate, triacetyl cellulose, epoxy resins, and phenol resins, and uniaxially stretched films thereof. Some of these films exhibit a sufficient capability to align the liquid crystalline substance used in the present invention depending on the production method of the films even though they are not subjected to an aligning treatment. However, if a film does not have an aligning capability sufficiently or at all, the film may be stretched under an appropriate heating treatment; subjected to a rubbing treatment wherein the film is rubbed in one direction with a rayon cloth or wherein the film is rubbed after an aligning layer of a conventional aligning agent such as polyimide, polyvinyl alcohol, or a silane coupling agent is formed over the film; subjected to oblique vapor deposition using silicon oxide; or subjected to the combination of these treatments so as to be provided with an aligning capability. Alternatively, the aligning substrate may be metal plates of aluminum, iron, or copper and various glass plates on which surfaces fine grooves are regularly formed.

The stress blocking layer used in the present invention is an optically isotropic transparent layer whose thickness is 0.3 μm or more and 40 μm or less, preferably 0.5 μm or more and 10 μm or less and whose glass transition temperature (Tg) is 20° C. or higher, preferably 50° C. or higher. No particular limitation is imposed on the materials of the stress blocking layer as long as they do not harm extremely the optical properties of the liquid crystalline substance. A stress blocking layer with a thickness and glass transition temperature outside the above-described ranges is not preferred because the layer would be poor in its effects and would not comply with one of the purposes of the present invention, i.e., the decrease of thickness. Specific examples of the materials are copolymers of acryl-, methacryl-, nitrocellulose-, epoxy-based compounds, and mixtures thereof.

The physical properties of the stress blocking layer may be controlled by adding thereto a cross-linkable so as to be partially cross-linked, a plasticizer or a lubricant.

No particular limitation is imposed on the method of forming the stress blocking layer on an optical anisotropic element. For example, there may be employed a transferring method wherein a material to be formed into a stress blocking layer with the above-described thickness is coated or extruded over a re-peelable substrate film such as polyethylene, polypropylene, and polyethylene terephthalate beforehand, and the layer is adhered to a tacky adhesive/adhesive layer or a transparent protective layer and peeled off from the re-peelable substrate film.

Although the functions of the stress blocking layer used in the present invention are not made clear, it is assumed that the layer can prevent distortion caused various stresses assumedly generating during a manufacturing/processing step from being applied directly to the liquid crystalline substance layer and can restrain fine wrinkly deformation or cracking from occurring in a supporting substrate-free liquid crystalline substrate layer, by relieving or canceling deformation accompanied with the stress remaining in for example a tacky adhesive/adhesive layer.

No particular limitation is imposed on tacky adhesives/adhesives as long as they have enough tackiness and adhesiveness to a liquid crystalline substance layer, a stress blocking layer, a transparent protective layer provided if necessary, and a polarizer and do not harm the optical properties of the liquid crystalline substance layer. For example, they may be acrylic resin-, methacrylic resin-, epoxy resin-, ethylene-vinyl acetate copolymer-, rubber-, urethane-, polyvinylether-based ones, mixtures thereof, and various reactive ones such as of thermal curing and/or photo curing types, and electron radiation curing types. Some of these adhesives include those having a function as a transparent protective layer.

The reaction conditions, i.e., those for curing the reactive tacky adhesives or adhesives vary depending on the formulation, viscosity and reaction temperature thereof. Therefore, the curing may be conducted under the conditions properly selected. For example, photo-curing type tacky adhesives or adhesives may be blended with various known photo initiator and reacted with a light irradiated from a light source such as a metal halide lamp, a high-pressure mercury lamp, a low-pressure mercury lamp, a xenon lamp, an arc discharge lamp, a laser, and a synchrotron radiation light source. The irradiation dose per $cm^2$ is within the range of generally 1 to 2,000 mJ and preferably 10 to 1,000 mJ in the integrated irradiation dose. However, when the absorption region of the photo initiator is extremely different from the spectrum of the light source or the reactive compound itself can absorb a light in the wavelength of the light source, the irradiation dose is not limited to the above range. In these cases, a method may be employed in which a suitable photo sensitizer or two or more kinds of photo initiators having different absorption wavelengths from each other is used. The electron radiation curing type adhesives may be cured at an accelerating voltage of usually 10 kV to 200 kV and preferably 50 kV to 100 kV.

The thickness of the tacky adhesive/adhesive layer varies depending on the formulations, strength, and temperatures at which it is used, but is usually from 1 to 50 μm, preferably from 3 to 30 μm. A thickness outside these ranges is not preferred because the tackiness/adhesiveness strength would be insufficient and the adhesive seeps out from the edges of the layer on which it is applied.

Alternatively, for the purpose of controlling optical properties, to these tacky adhesives/adhesives may be added various fine particles to an extent that they do not harm the characteristics of these adhesives. Examples of such fine particles are fine particles having a different refraction index from compounds constituting the tacky adhesive/adhesive, conductive fine particles for improving anti-static properties without harming transparency, and fine particles for improving wear resistance. More specific examples are fine silica, ITO (Indium Tin Oxide) fine particles, silver fine particles, and various synthetic resin fine particles. Furthermore, to the tacky adhesives/adhesives may be added various additives such as oxidation inhibitors and ultraviolet absorbing agents to an extent that they do not harm the effects achieved by the present invention.

The transparent protective layer provided if necessary, is provided for the purpose of protecting the surfaces of the liquid crystalline substance layer and enhancing the mechanical strength thereof upon a post processing step such as forming the stress blocking layer. Materials for the transparent protective layer may be those as long as they have sufficient adhesivity to the liquid crystalline substance layer and the stress blocking layer and are optically isotropic. Therefore, the above-described tacky adhesives/adhesives may be used as the transparent protective layer. Preferred examples of such tacky adhesives/adhesives are the above-described reactive ones such as of photo curing type, electron radiation curing type, and thermal curing type, among which suitably used are photo curing type and electron radiation curing type adhesives containing as a main component a (meth) acrylate-based oligomer, epoxy resin based photo curing type, and electron radiation curing type adhesives.

No particular limitation is imposed on the thickness of the transparent protective layer. However, the thickness is usually from 1 to 50 μm, preferably from 3 to 30 μm. A thickness outside these ranges is not preferred because adhesive strength would be poor and a part of the purposes of the present invention, i.e., decrease of the total thickness of a polarizer could not be achieved.

No particular limitation is imposed on a polarizer used in the elliptical polarizer of the present invention as long as it can achieve the purposes of the present invention. Therefore, any conventional polarizers normally used in a liquid crystal display may be used, but preferred are thin-film type polarizers which have recently developed. Specific examples of polarizers are PVA (polyvinyl alcohol)-based polarizing films such as PVA and partial acetal PVA; polarizing films such as those obtained by stretching a hydrophilic polymeric film which comprises a partially saponified product of an ehtylene-vinyl acetate copolymer and absorbs iodine and/or dichroic dye; and those comprising a polyene-oriented film such as a dehydrated product of PVA and a dechlorinated product of polyvinyl chloride. Alternatively, there may be used reflection type polarizers.

These polarizers may be used independently or in combination with a transparent protective layer which may be provided on one or both of the surfaces of the polarizer for the purpose of enhancing the strength, moisture resistance, and heat resistance. Examples of the transparent protective layer are those formed by laminating a transparent plastic film such as polyester and triacetyl cellulose directly or via an adhesive layer on the polarizer; coated layers of resin; and acrylic- or epoxy-based photo-curing type resin layers. When the protective layers are coated on both of the surfaces of the polarizer, they may be the same or different from each other.

Methods of producing the optically anisotropic element used in the present invention will be described below. The method of producing the optically anisotropic element is not limited those described hereinafter but preferably goes through the procedures thereof.

First of all, a coated film of a liquid crystalline substance is formed over an alignment substrate by a suitable method, followed by removal of the solvent if necessary, and then heated to be aligned completely in liquid crystal orientation and subjected to a suitable treatment to fix the liquid crystalline substance layer. Thereafter, at least a tacky adhesive/adhesive layer is formed over the fixed liquid crystalline substance layer, and separately from this, a stress blocking layer is formed over a re-peelable substrate and adhered to the tacky adhesive/adhesive layer, followed by peeling off the aligning substrate thereby obtaining an optical anisotropic element with a structure of (re-peelable substrate)/stress blocking layer/tacky adhesive or adhesive layer/liquid crystalline substance layer.

Alternatively, a transparent protective layer is formed over a liquid crystalline substance layer formed on an alignment substrate, and a stress blocking layer on a re-peelable substrate is formed via a tacky adhesive/adhesive layer over the transparent protective layer, followed by peeling off the alignment substrate thereby obtaining an optical anisotropic element with a structure of (re-peelable substrate)/stress blocking layer/tacky adhesive or adhesive layer/transparent protective layer/liquid crystalline substance layer. Further alternatively, after a photo reactive adhesive layer which will be a first transparent protective layer is coated over a liquid crystalline substance layer on an alignment substrate and adhered to a re-peelable substrate, the adhesive layer is photo-cured so as to be a transparent protective layer, followed by peeling off the alignment substrate. On the exposed surface of the liquid crystalline substance layer was formed a second transparent protective layer attached on a re-peelable substrate. After either one of the re-peelable substrates on the first and second transparent substrates is peeled off and a stress blocking layer is attached via a tacky adhesive/adhesive layer to the exposed surface of the transparent protective layer, the re-peelable substrate on the other transparent protective layer is peeled off thereby obtaining an optical anisotropic layer with a structure of (re-peelable substrate on which a stress blocking layer was formed)/stress blocking layer/tacky adhesive or adhesive layer/transparent protective layer/liquid crystalline substance layer/transparent protective layer.

Further alternatively, there may be employed a method wherein after a material acting as a tacky adhesive/adhesive is used for forming a first or second transparent protective layer and adhered to a stress blocking layer formed on a re-peelable substrate, the material is cured.

The thickness of an optical anisotropic element thus obtained is 325 µm or less, preferably 225 µm or less, and further preferably 175 µm or less. A thickness outside these ranges is not preferred because an optical anisotropic element with such a thickness would not comply with one of the purposes of the present invention, i.e., the decrease of the thickness of a polarizer.

The elliptical polarizer of the present invention can be obtained by peeling off the unnecessary re-peelable substrate from the optical anisotropic element as obtained above and laminating the element via a tacky adhesive/adhesive on a polarizer. One or plurality of optical anisotropic elements may be attached to the polarizer.

The total thickness of the elliptical polarizer is 450 µm or less, preferably 350 µm or less, and more preferably 300 µm or less. A total thickness outside of these ranges is not preferred because it would not comply with one of the purposes of the present invention, i.e., the decrease of the thickness of a polarizer.

In addition to a polarizer and an optical anisotropic element, the elliptical polarizer of the present invention may contain one or more anti-reflection layers, anti-glare layers, hard coat layers, and photo diffusive layers.

In the present invention, two or more kind of liquid crystalline substance layers may be laminated via a tacky adhesive/adhesive.

In the elliptical polarizer of the present invention, the optical anisotropic element used therein may be combined with one or more another optical anisotropic element layers. Such another optical anisotropic layers may be those utilizing known stretched polymeric films or liquid crystal films. Stretched polymeric films may be obtained by subjecting polymeric substances to known forming processes such as stretching, filming, rolling, drawing, solid extrusion, and blow-forming.

A liquid crystal display device equipped with at least one sheet of the elliptical polarizer of the present invention comprises the elliptical polarizer, a polarizer, and a liquid crystal cell having a liquid crystal between a pair of substrates which can apply an electrical field and at least one of which is transparent, if necessary an optical retardation compensation plate, a reflection layer, a photo diffusing layer, a back light, a front light, a photo-controlling film, a light guide plate, a prism sheet or the like.

No particular limitation is imposed on the structure of the liquid crystal display device of the present invention. The elliptical polarizer may be arranged on the viewer's side or light source side of the liquid crystal cell and arranged on the position determined after examining where the function and effects of the elliptical polarizer are maximally performed. The number of the elliptical polarizer to be used may be one or more.

Components, other than the elliptical polarizer of the present invention, constituting the liquid crystal display device may be any conventional ones and those obtained from known materials and by any known method.

In addition to the substrates which can apply an electrical field and the liquid crystal layer, the liquid crystal cell may be provided with various constituting elements necessary to obtain liquid crystal cells of various modes described hereinafter.

Examples of liquid crystal cell modes are various modes such as TN (Twisted Nematic), STN (Super Twisted Nematic), ECB (Electrically Controlled Birefringence) IPS (In-Plane Switching), VA (Vertical Alignment), OCB (Optically Compensated Birefringence), HAN (Hybrid Alignment Nematic), and ASM (Axially Symmetric Aligned Microcell) modes.

No particular limitation is imposed on the driving mode of the liquid crystal cell. Therefore, it may be any of a passive matrix mode used in an STN-LCD, an active matrix mode using active electrodes such as TFT (Thin Film Transistor) electrodes and TFD (Thin Film Diode) electrodes, and a plasma address mode.

Applicabilities in the Industry

The present invention can provide an elliptical polarizer comprising as a constituting element a thinned optical anisotropic element which is free of fine wrinkly deformation of and cracking in a liquid crystalline substance layer assumedly caused by various stresses generating during a manufacturing/processing steps and a liquid crystal display device equipped with such an elliptical polarizer. The thickness of the liquid crystal display can be decreased due to the use of the thinned elliptical polarizer.

Best Modes of Carrying out the Invention

The present invention will be further described with the following examples but are not limited thereto.

EXAMPLE 1

A polymerization was conducted at a temperature of 270° C. under a nitrogen atmosphere for 12 hours using 50 mmol of terephthalic acid, 50 mmol of 2,6-naphthalene dicarboxylic acid, 40 mmol of methylhydroquinone diacetate, 60 mmol of catecholdiacetate, and 60 mg of N-methylimidazole. The resulting reaction product was dissolved in tetrachloroethane and then reprecipitated with methanol to be purified thereby obtaining 14.7 g of a liquid crystalline polyester (polymer 1). Polymer 1 was found to be 0.17 dl/g in inherent viscosity measured in a phenol/tetrachloroethane mixed solvent (mass ratio: 60/40) at a temperature of 30° C. and exhibited a nematic phase as the liquid crystalline phase. It was also confirmed that the isotropic phase-liquid crystalline transition temperature and glass transition temperature by DSC were 250° C. or higher and 115° C., respectively.

90 mmol of biphenyldicarbonyl chloride, 10 mmol of terephthaloyl chloride, and 105 mmol of S-2-methyl-1,4-butanediol were reacted in dichloromethane at room temperature for 20 hours. The resulting reaction solution was charged into methanol so as to be reprecipitated thereby obtaining 12.0 g of a liquid crystalline polyester (polymer 2). The inherent viscosity of Polymer 2 was 0.12 dl/g. 19.82 g of polymer 1 and 0.18 g of polymer 2 were dissolved in 80 g of N-methyl-2-pyrrolidone thereby preparing a solution. The solution was spin-coated over a polyimide film, "KAPTON" manufactured by Du Pont Co., having been rubbed with a rayon cloth. The coated solution was dried to remove the solvent and then heated at a temperature of 210° C. for 20 minutes thereby forming a twisted nematic orientation structure. The film was cooled to room temperature to fix the twisted nematic orientation structure thereby obtaining a uniformly aligned 3.0 μm actual thickness liquid crystalline substance layer on the polyimide film (laminate 1). The thickness was measured using a contact pin type thickness meter.

Onto the liquid crystalline substance layer surface of laminate 1 was coated a commercially available UV-curing type adhesive "UV-3400" manufactured by Toagosei Co., Ltd. with a thickness of 5 μm thereby obtaining an adhesive layer (adhesive layer 1). Onto adhesive layer 1 was laminated a 25 μm thickness polyethylene terephthalate (PET) film "S10" manufactured by Toray Industries, Inc., (PET film 1) which was used as a re-peelable substrate, followed by an ultraviolet ray irradiation of about 600 mJ so as to cure adhesive layer 1. Thereafter, the polyimide film was peeled off from the laminate of PET film 1/adhesive layer 1/liquid crystalline substance layer/polyimide film so as to transfer the liquid crystalline substance layer via adhesive layer 1 on the re-peelable substrate, i.e., PET film 1 thereby obtaining a laminate containing a liquid crystalline substance layer (laminate 2).

Thereafter, onto the liquid crystalline substance surface of laminate 2 was coated a commercially available UV-curing type adhesive "UV-3400" manufactured by Toagosei Co., Ltd. with a thickness of 5 μm thereby obtaining an adhesive layer (adhesive layer 2). Onto a 25 μm thickness PET film "S10 (trade name)" manufactured by Toray Industries, Inc., (PET film 2) which was used as a re-peelable substrate was formed a 1 μm thickness stress blocking layer formed of polymethylacrylate (reagent manufactured by Aldrich Co., Ltd.) with a weight-average molecular weight of 30,000, such that the stress blocking layer faced adhesive layer 2. The laminate was irradiated with an ultraviolet ray of about 600 mJ so as to cure adhesive layer 2. Thereafter, PET film 2 was peeled off from the laminate of PET film 1/adhesive layer 1/liquid crystalline substance layer/adhesive layer 2/stress blocking layer/PET film 2 so as to transfer the stress blocking layer via adhesive layer 2 on the liquid crystalline substance layer side thereby obtaining a liquid crystal film (liquid crystal film 3).

Onto the stress blocking layer surface of liquid crystal film 3 was laminated a tacky adhesive layer of about 25 μm thickness with a separate film (tacky adhesive layer 1). Thereafter, PET film 1 was peeled off from the laminate of PET film 1/adhesive layer 1/liquid crystalline substance layer/adhesive layer 2/stress blocking layer/tacky adhesive layer 1/separate film thereby obtaining a supporting substrate-free liquid crystal film (liquid crystal film 4).

Next, onto adhesive layer 1 was laminated via a 25 μm thickness tacky adhesive layer (tacky adhesive layer 2) a polarizer "SQ-1852AP" manufactured by Sumitomo Chemical Co., Ltd. with a thickness of about 180 μm thereby obtaining an elliptical polarizer formed by the laminate of polarizer/tacky adhesive layer 2/adhesive layer 1/liquid crystalline substance layer/adhesive layer 2/stress blocking layer/tacky adhesive layer 1/separate film (elliptical polarizer 1).

Elliptical polarizer 1 had a total thickness, excluding the separate film, of 244 μm which was able to be extremely decreased compared with a conventional elliptical polarizer with a supporting substrate.

After the separate film was peeled off from the resulting Polarizer 1, tacky adhesive layer 1 thereof was attached to the viewer's side polarizer of a commercially available reflection type liquid crystal display device. The liquid crystal display device was subjected to a 500 hour reliability accelerated test at a temperature of 60° C. and a humidity of 90% using a temperature and humidity chamber "PL-2SP" manufactured by ESPEC CORP. As a result, neither change in displaying characteristic performances nor in the liquid crystal substance layer was observed.

Comparative Example 1

Separately from Example 1, a 5 μm thickness adhesive layer of a commercially available UV-curing type adhesive "UV-3400" manufactured by Toagosei Co., Ltd. (adhesive layer 2) was formed on the liquid crystalline substance layer surface of laminate 2 obtained by following the same procedures of Example 1. Onto adhesive layer 2 was laminated a PET film "S10" manufactured by Toray Industries, Inc. (PET film 3), which was used as a re-peelable substrate but has no stress blocking layer. The laminate was irradiated with an ultraviolet ray of about 600 mJ so as to cure the adhesive. Thereafter, PET film 3 was peeled off from the laminate of PET film 1/adhesive layer 1/liquid crystalline substance layer/adhesive layer 2/PET film 3 thereby obtaining a liquid crystal film having no stress blocking layer (liquid crystal film 5).

Next, onto adhesive layer 2 of liquid crystal film 5 was laminated a tacky adhesive layer of about 25 μm thickness with a separate film (tacky adhesive layer 1). Thereafter, the PET film 1 was peeled off from the laminate of PET film 1/adhesive layer 1/liquid crystalline substance layer/adhesive layer 2/tacky adhesive layer 1/separate film thereby obtaining a liquid crystal film having no supporting substrate film and stress blocking layer (liquid crystal film 6).

Next, onto adhesive layer 1 of liquid crystal film 6 was laminated via a 25 μm thickness tacky adhesive layer (tacky adhesive layer 2) a polarizer "SQ-1852AP" manufactured by Sumitomo Chemical Co., Ltd. with a thickness of about 180 μm thereby obtaining an elliptical polarizer formed by the laminate of polarizer/tacky adhesive layer 2/adhesive layer 1/liquid crystalline substance layer/adhesive layer 2/tacky adhesive layer 1/separate film (elliptical polarizer 2).

Elliptical polarizer 2 had a total thickness, excluding the separate film, of 243 μm which was able to be extremely decreased compared with conventional elliptical polarizers with supporting substrates.

Similarly to Example 1, after the separate film was peeled off from the resulting polarizer 2, tacky adhesive layer 1 thereof was attached to the viewer's side polarizer of a commercially available reflection type liquid crystal display device. The liquid crystal display device was subjected to a 500 hour reliability accelerated test at a temperature of 60° C. and a humidity of 90% using a temperature and humidity chamber "PL-2SP" manufactured by ESPEC CORP. As a result, the liquid crystal displayed image of the device was slightly whitish and wrinkles, which was able to be observed with the naked eyes, formed in the liquid crystalline substance layer. Through a 10-fold magnifying observation of the display, many wrinkles and cracks were found. It was thus confirmed that they caused the decrease of the displaying characteristic performances.

What is claimed is:

1. An elliptical polarizer comprising at least a polarizer and an optical anisotropic element wherein said optical anisotropic element comprises a liquid crystalline substance layer with a fixed liquid crystal orientation, a tacky adhesive/adhesive layer, and a stress blocking layer having a thickness of 0.3 μm or greater and 40 μm or less and a glass transition temperature (Tg) of 20° C. or higher.

2. The elliptical polarizer according to claim 1 wherein said stress blocking layer is arranged between said liquid crystalline substance layer and said tacky adhesive/adhesive layer.

3. The elliptical polarizer according to claim 1 wherein the elliptical polarizer has a thickness of 450 μm or less.

4. A liquid crystal display device equipped with at least one elliptical polarizer as defined in claim 1.

* * * * *